O. W. BERG.
CHUCK.
APPLICATION FILED NOV. 21, 1914.
1,141,305.
Patented June 1, 1915.
2 SHEETS—SHEET 1.
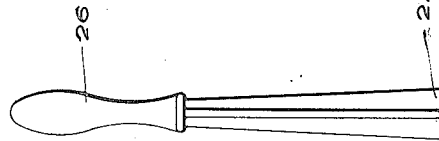
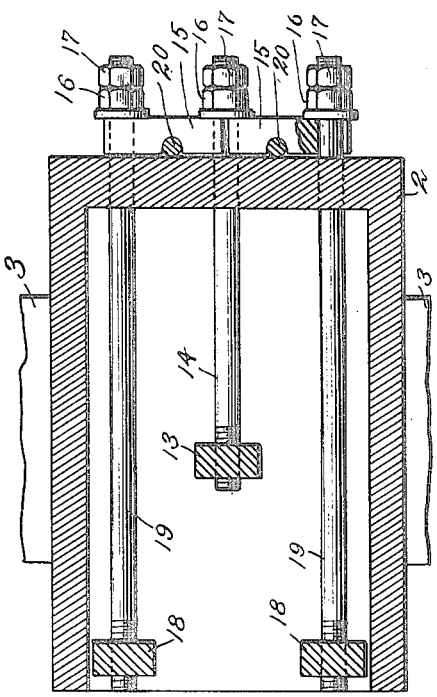
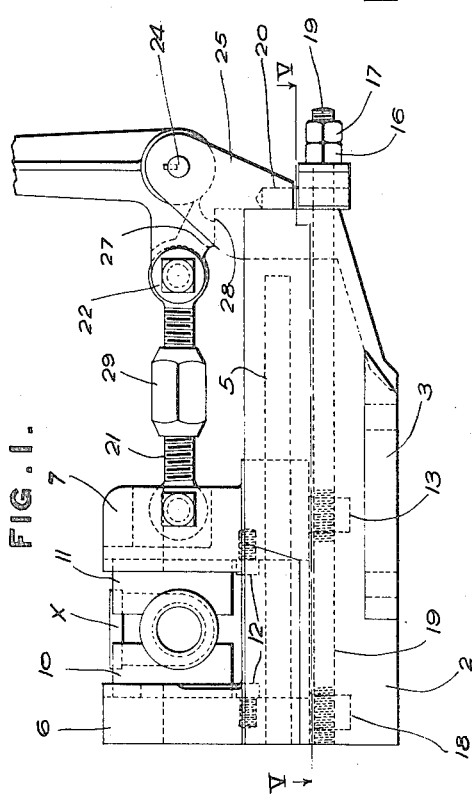
WITNESSES
Chas. Josterman
R. D. Little
INVENTOR
Oscar W. Berg
by C. Luchienne
his Attorney O. W. BERG.
CHUCK.
APPLICATION FILED NOV. 21, 1914.
1,141,305.
Patented June 1, 1915.
2 SHEETS—SHEET 2.
FIG. 2
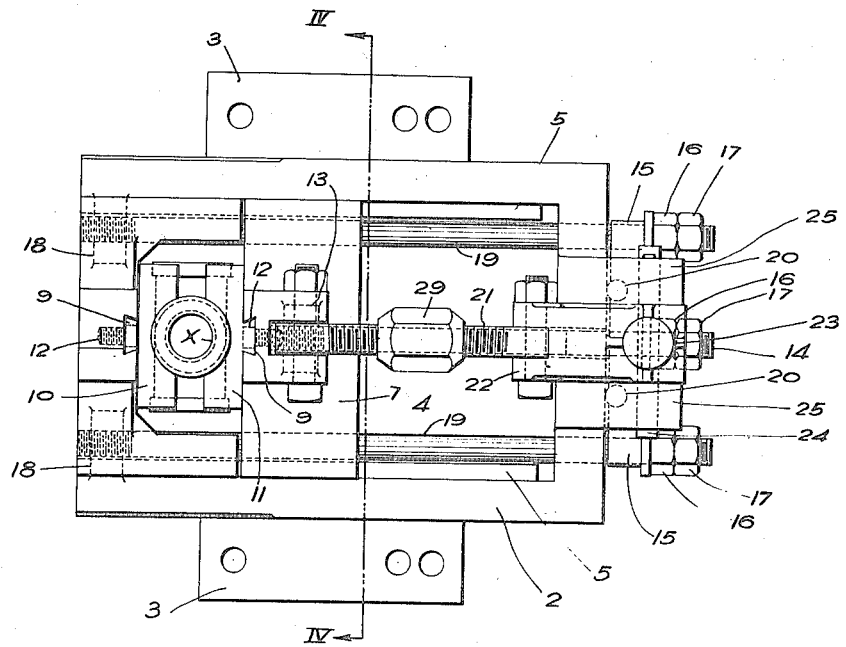
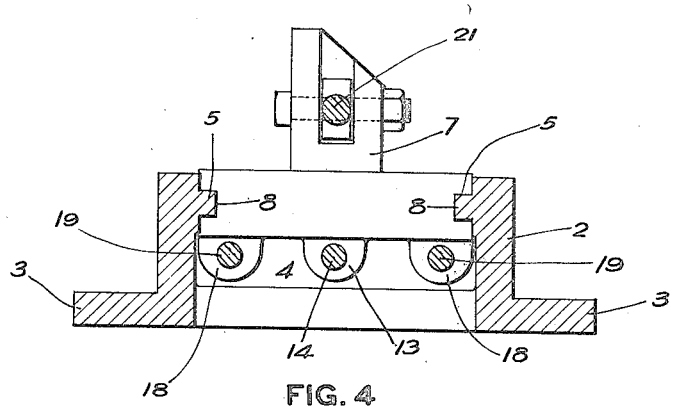
FIG. 4
WITNESSES
INVENTOR
Oscar W. Berg
by C C Luthieim
his Attorney

UNITED STATES PATENT OFFICE.

OSCAR W. BERG, OF KEWANEE, ILLINOIS, ASSIGNOR TO NATIONAL TUBE COMPANY, OF PITTSBURGH, PENNSYLVANIA, A CORPORATION OF NEW JERSEY.

CHUCK.

1,141,305.      Specification of Letters Patent.      Patented June 1, 1915.

Application filed November 21, 1914. Serial No. 873,276.

*To all whom it may concern:*

Be it known that I, OSCAR W. BERG, a citizen of the United States, and resident of Kewanee, in the county of Henry and State of Illinois, have invented certain new and useful Improvements in Chucks, of which the following is a specification.

My invention relates to the construction of chucks for drill presses, tapping machines and similar machine tools, and more particularly relates to chucks for tapping machines used in tapping pipe fittings such as T's, elbows and crosses and like internally threaded articles.

One object of my invention is to provide a manually actuated chuck having novel means whereby the articles being drilled, tapped or otherwise machined, are automatically centered with respect to the spindle of the tapping machine or other tool to which the chuck is applied for use.

Another object of the invention is to provide a chuck having novel means whereby the chuck jaws are adjusted to suit pipe fittings or other articles of various sizes and shapes and whereby the adjusted jaws are mechanically moved into and out of holding position in centering the articles held therebetween.

A further object of this invention is to provide a self adjusting chuck having improved means whereby the chuck jaws are maintained in holding engagement with the articles being machined.

Still further objects of my invention will become apparent as the invention is more fully described hereinafter and is specifically pointed out in the appended claims.

Referring to the drawings, forming part of this specification, Figure 1 is a longitudinal side elevation showing a chuck constructed and arranged in accordance with my invention. Fig. 2 is a plan of the chuck shown in Fig. 1. Fig. 3 is a rear end elevation of the apparatus shown in Figs. 1 and 2. Fig. 4 is a sectional end elevation of the apparatus shown in Figs. 1, 2 and 3, the section being taken on the line IV—IV of Fig. 2. Fig. 5 is a sectional plan, taken on the line V—V of Fig. 1 showing the arrangement of rods and levers by which the jaw holders and jaws of the chuck are operatively connected.

In the accompanying drawings the numeral 2 designates the slide of the chuck which is provided with flanges 3, 3 having bolt holes therein by which the chuck is fastened to a thread tapping machine, drill press or other machine tool to which the chuck is applied for use. The slide 2 has a central opening or recess 4 therein and the side faces of the opening or recess are provided with tongues forming ways 5 for the sliding jaw holders 6 and 7 of the chuck, these jaw holders having longitudinal grooves 8 in the slide surfaces thereof, into which the tongues 5 project. A dovetailed groove 9 is provided in one side of each of the jaw holders by which the work gripping jaws 10 and 11 of the chuck are removably secured on the holders and the cap screws 12 in the bottom of each dovetailed groove serve as stops to limit the downward movement of the jaws and maintain the jaws 10 and 11 in position vertically on the holders 6 and 7. The gripping jaws 10 and 11 are removable so that jaws of various sizes and jaws having recesses of varying contours in the gripping faces thereof may be employed. In the illustrations, a T being the particular kind of pipe fitting shown, the opposite faces of the jaws are provided with semi-circular recesses, extending vertically and horizontally, corresponding to the contour of the T, so as to securely hold the T X in position while tapping or threading the branch opening and other openings therein.

Projecting downwardly from the lower surface of the jaw holder 7 is a lug 13 having a screw threaded opening in which one end of the rod 14 is secured. The rod 14, which is located below the jaw holders, is engaged at its other end by the adjoining or inner slotted ends of the pivoted levers 15. An adjusting nut 16 and lock nut 17 on the end of the rod 14 afford means for adjusting the levers 15 on the rod 14.

The jaw holder 6 is provided with two downwardly extending lugs 18 on its lower surface having screw threaded openings therein in which the inner ends of the rods 19 are secured and the rods 19 extend below the jaw holder into engagement with the slotted outer ends of the pivoted levers 15, adjusting nuts 16 and lock nuts 17 being provided on the threaded outer ends of the rods 19 to adjust these rods relatively to the pivoted levers 15. Each of the levers 15 has a semi-circular recess in one side thereof and positioned in each of these recesses is a pivot pin 20, these pins being secured by one end in suitable openings in the lower ends of the lugs 25 on one end of the slide 2.

Pivotally secured to the jaw holder 7 by means of a sectional link 21 is the forked arm 22 of the vertically extending jaw operating lever 23. The lever 23 is pivoted on the shaft 24 in the integral lugs or ears 25 on one end of the chuck slide 2, and has a handle 26 on one end by which the apparatus is manually operated in opening and closing the chuck jaws. The forked end 22 of the lever 23 is provided with a stop 27 which engages with the upper face 28 of the slide 2 to limit the closing movement of the jaws. A sleeve nut 29, with a right hand thread on one end and left hand thread on the other end, connects the adjacent screw threaded ends of the sections of the link 21 and makes the link adjustable in length, so as to enable the gripping jaws and jaw holders to be moved toward and away from each other in adjusting the jaws to suit any particular article to be held between the jaws.

In the operation of my improved chuck, the parts being assembled as shown, gripping jaws 10 and 11 of the necessary size and shape are placed in position in the dovetailed slots 9 of the jaw holders 6 and 7. A T X of the size to be operated upon is then placed between the jaws 10 and 11 and the sleeve nut 29 is turned on the link 21 so as to bring the jaw 11 on the holder 7 into engagement with the fitting X between the jaws, when the fitting is in axial alinement with the spindle of the machine tool, the handle 23 being placed in the vertical position shown in Fig. 1 in adjusting the jaw 11 and jaw holder 7. The nuts on the end of the rod 14 are then turned to move the pivoted lever arms 15 until they extend lengthwise in alinement in a vertical plane. The nuts 16 and 17 on the rods 19, 19 are then adjusted to move the jaw holders 6 and gripping jaw 10 into holding engagement with the fitting between the jaws 10 and 11, the fitting meanwhile still being in alinement axially with the spindle of the machine tool to which the chuck is applied. These operations adjust and position the holding jaws in holding engagement with the particular size or kind of fitting being machined. The machine tool is then started and, depending upon the operation being carried out, the fitting held between the gripping jaws 10 and 11 is tapped or drilled or otherwise machined. After the machining operation is completed the lever 23 is moved to shift the jaw holder 7 and gripping jaw 11 toward the front of the slide 2 and release the fitting between the jaws. This movement of the jaw holder 7 releases the fitting X and moves the rod 14 so as to permit the inner ends of the pivoted levers 15 to move outwardly or away from the slide 2, and the movement of the levers 15 frees the rods 19 and permits the jaw holder 6 and gripping jaw 10, when necessary or desirable, to move outwardly or away from the jaw 11. A new fitting is then placed between the jaws 6 and 7 and the lever 23 is moved until again in the position shown in Fig. 1. This movement of the lever causes the jaw holder 7 and gripping jaw 11 to move toward the fitting and, through the rod 14, causes the adjoining ends of the pivoted levers 15 to move inwardly toward the slide 2. In this way the gripping jaws 10 and 11 are caused to grip the article positioned between the jaws and the articles placed between the jaws are accurately centered with respect to the center of rotation of the spindle of the machine tool. The above described operations are then repeated with any number of articles of the size to which the jaws are adjusted.

A fitting or other article which is materially different in size from that previously held between the gripping jaws will not be tightly grasped by the jaws, when smaller, and will prevent the stop 27 on the operating lever being brought into engagement with the face 28 of the slide, when larger, and in such case a relative adjustment of the jaws is necessary. When the difference in size or contour is slight, the necessary adjustment may be made by turning the sleeve nut 29 the required amount. When the difference in size or contour is too great to make adjustment by turning the sleeve nut 29 advisable or practical, the nuts 16 and 17 on the rod 14 or rods 19, or both, are turned sufficiently to adjust the jaw holders 6 and 7 so that the fitting will be accurately centered and be tightly grasped by the jaws when the operating lever 23 is in the position shown in Fig. 1, with the stop 27 in engagement with the face 28 of the slide 2. In either case the equalizing levers 15 will cause the article clamped between the jaws to be accurately centered with respect to the axis of the tool holding spindle of the machine on which the chuck is mounted. When necessary the gripping jaws are removed and replaced by other jaws to suit the size of a different article when the size is changed or a new form of fitting is to be operated upon and in such case the adjustment of the jaws will be again carried out in the manner which has been described.

The advantages of my invention will be apparent to those skilled in the art. The apparatus is simple, is cheaply constructed and is easily kept in repair. By the use of apparatus embodying my invention, pipe fittings and other articles are accurately centered for the tapping, drilling, or other machining operation.

Modifications in the construction and arrangement of the parts may be made without departing from my invention. The size and shape of the gripping jaws may be varied, the manner of securing the gripping jaws on the jaw holders may be changed, the means employed in connecting the operating lever with the gripping jaws may be other than that shown, and other variations may be made in the construction of the apparatus within the scope of the appended claims.

I claim:

1. A chuck comprising a slide, gripping jaws movably mounted on the slide, an equalizing lever pivoted on the end of said slide, means connecting one end of said equalizing lever to one jaw and the opposite end thereof to the other jaw, and an operating lever pivotally mounted on the slide and connected to one gripping jaw for actuating said jaws.

2. A chuck comprising a slide, gripping jaws movably mounted on the slide, equalizing levers on the end of said slide, means connecting one end of the levers to one jaw and the opposite end of said levers to the other jaw, and an operating lever pivotally mounted on the slide and connected to one gripping jaw for actuating the jaws, said operating lever being adjustably connected to the jaw to vary the position of the jaws on said slide.

3. A chuck comprising a slide, gripping jaws movably mounted on the slide, equalizing levers on the end of said slide, means connecting one end of the levers to one jaw and the other end thereof to the other jaw, an operating lever pivotally mounted on the slide and connected to one gripping jaw for actuating said jaws, and a stop on the slide engaging the operating lever to limit the closing movement of the gripping jaws.

4. A chuck comprising a slide having means for attachment to a machine tool, oppositely facing movable gripping jaws on the slide, an operating lever adjustably connected to one jaw for varying the closing movement of the jaws, and means pivoted on the slide, for adjustably connecting one jaw with the other to vary the width of opening between said jaws, said means equalizing the movement of the jaws in closing the jaws.

5. A chuck comprising a slide having means for attachment to a machine tool, gripping jaws movably mounted on said slide, equalizing levers pivoted on said slide, means connecting one end of said levers to one gripping jaw, means connecting the adjacent ends of said levers to the other jaw, an operating lever and means adjustably connecting said operating lever with one gripping jaw whereby the jaws are positively actuated.

In testimony whereof, I have hereunto set my hand.

OSCAR W. BERG.

Witnesses:
C. S. STOUFFER,
FRED J. TALBOTT.